United States Patent
Jang

[11] Patent Number: 5,999,309
[45] Date of Patent: Dec. 7, 1999

[54] OPTICAL PULSE AMPLIFIER

[75] Inventor: Joo-nyung Jang, Yongin, Rep. of Korea

[73] Assignee: SamSung Electronics Co., Ltd., Kyungki-do, Rep. of Korea

[21] Appl. No.: 09/139,432

[22] Filed: Aug. 25, 1998

[30] Foreign Application Priority Data

Aug. 26, 1997 [KR] Rep. of Korea ..................... 97-41199

[51] Int. Cl.⁶ ...................................................... H01S 3/00
[52] U.S. Cl. ........................................... 359/341; 359/349
[58] Field of Search ................................... 359/341, 349; 385/147

[56] References Cited

U.S. PATENT DOCUMENTS

| | | | |
|---|---|---|---|
| 5,499,134 | 3/1996 | Galvanauskas et al. ................. | 359/333 |
| 5,847,863 | 12/1998 | Galvanauskas et al. . | |
| 5,872,649 | 2/1999 | Byron et al. ............................. | 359/341 |
| 5,887,091 | 3/1999 | Jabr et al. .................................. | 385/24 |
| 5,917,635 | 6/1999 | Cvijetic et al. .......................... | 359/179 |

FOREIGN PATENT DOCUMENTS 10-333194  12/1998  Japan .
10-333197  12/1998  Japan .

Primary Examiner—Mark Hellner
Attorney, Agent, or Firm—Robert E. Bushnell, Esq.

[57] ABSTRACT

An optical pulse amplifier includes: a first optical coupler, having first, second, third and fourth ports, for outputting an optical pulse incident onto the first port to the second and third ports, and for outputting the optical pulse re-incident from the second and third ports to the fourth port; a first grating connected to the second port of the first optical coupler for reflecting the incident optical pulse for each wavelength at a position satisfying the Bragg condition; a second grating, connected to the third port of the first optical coupler and having the same optical characteristics as the first grating, for reflecting the incident optical pulse for each wavelength at a position satisfying the Bragg condition; an optical amplifying portion, connected to the fourth port of the first optical coupler, for amplifying the optical pulse reflected by the first and second gratings and output by the fourth port of the first optical coupler; and a second optical coupler, having first, second, third and fourth ports, for outputting the optical pulse incident from the optical amplifying portion connected to the first port to the second and third ports, respectively, connected to the first and second gratings, and the optical pulse re-incident after being reflected by the first and second gratings to the fourth port. Therefore, a non-linear effect and a spectral hole burning effect can be avoided through amplification and broadening of the optical pulse, there is less diffraction loss, and manufacture of the optical pulse amplifier is easy.

20 Claims, 2 Drawing Sheets

OPTICAL PULSE AMPLIFIER

CLAIM OF PRIORITY

This application makes reference to, incorporates the same herein, and claims all benefits accruing under 35 U.S.C. §119 from an application for OPTICAL PULSE AMPLIFIER earlier filed in the Korean Industrial Property Office on the Aug. 26, 1997 and there duly assigned Ser. No. 4119/1997.

BACKGROUND OF THE INVENTION

1. Technical Field

The present invention relates to an optical pulse amplifier and, more particularly, to an optical pulse amplifier using a chirped grating.

2. Related Art

An erbium doped fiber amplifier has saturation energy of about 1 $\mu$J, at which the power of an output signal does not increase, even if the power of an input signal is increased. Peak power of an ultrashort pulse amplified at this energy is very high, (e.g., 1 MW at 1 pico second pulse), so that the intensity thereof greatly increases if the energy is confined to the core of an optical fiber, thereby causing non-linear effects and distorting the pulse. Also, a spectral hole burning effect occurs, in which amplification is not achieved due to a decrease in the stimulated emission gain.

To solve these problems, the ultrashort pulse is stretched, using a bulk diffraction-grating stretcher to lower the peak value of the power within the amplifier.

However, a problem wit the method using a bulk diffraction-grating stretcher is that the diffraction-grating arrangement is sensitive to polarization and is not strong. Also, the method causes much diffraction loss and distorts the profile of an output beam.

SUMMARY OF THE INVENTION

To solve the above problems, it is an objective of the present invention to provide an optical pulse amplifier which provides high power and less distortion using a chirped grating and a coupler.

To achieve the objective of the present invention, there is provided an optical pulse amplifier comprising: a first optical coupler having first, second, third and fourth ports for outputting an optical pulse incident onto the first port to the second and third ports, and the optical pulse re-incident from the second and third ports to the fourth port; a first grating connected to the second port of the first optical coupler for reflecting the incident optical pulse for each wavelength at a position satisfying the Bragg condition; a second grating connected to the third port of the first optical coupler and having the same optical characteristics as the first grating, for reflecting the incident optical pulse for each wavelength at a position satisfying the Bragg condition; an optical amplifying portion connected to the fourth port of the first optical coupler for amplifying the optical pulse reflected by the first and second gratings and output by the fourth port of the first optical coupler; and a second optical coupler having first, second, third and fourth ports for outputting the optical pulse incident from the optical amplifying portion connected to the first port to the second and third ports, connected to the first and second gratings respectively, and the optical pulse re-incident after being reflected by the first and second gratings to the fourth port.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1:
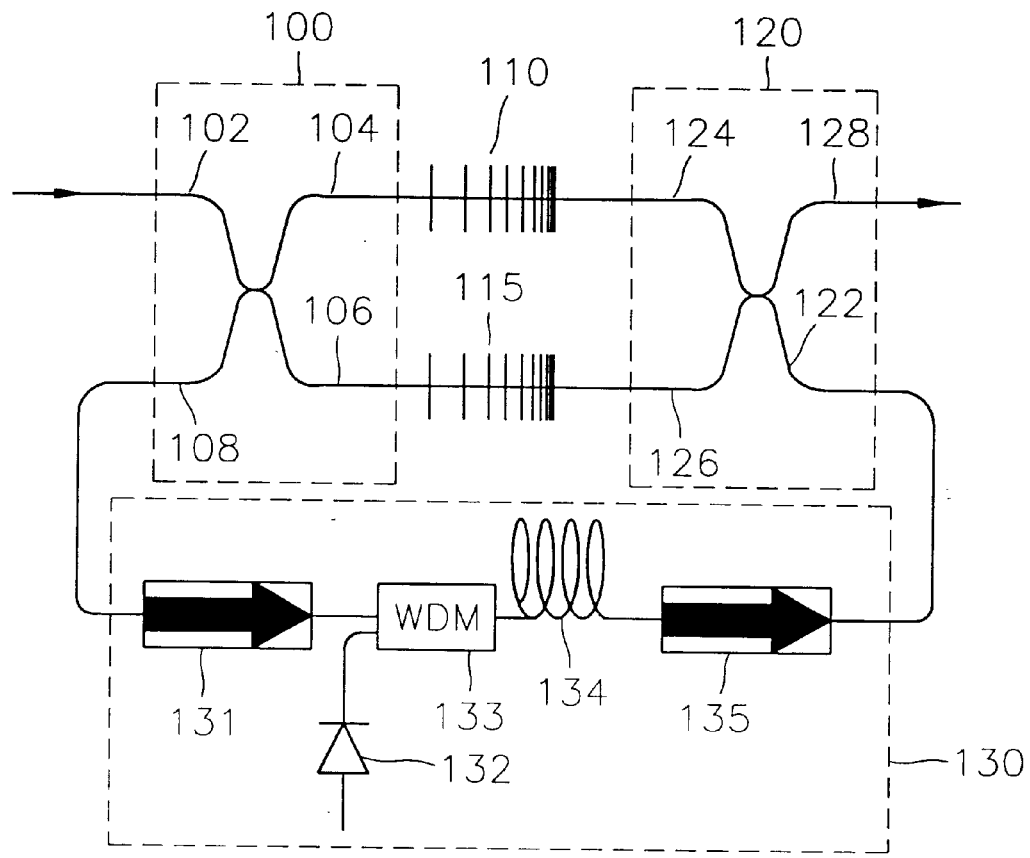
FIG. 1 is a diagram showing the structure of an optical pulse amplifier according to the present invention.

Referring to FIG. 1, an optical pulse amplifier according to the present invention includes a first optical coupler 100 having four ports, first and second chirped gratings 110 and 115, respectively, a second optical coupler 120 having four ports, and an optical amplifying portion 130.

The first optical coupler 100 has first, second, third and fourth ports 102, 104, 106 and 108, respectively, divides an input optical pulse with a ratio of 50:50, and shifts the phase of the optical pulse by $\pi/2$ whenever coupling occurs once. The first and second chirped gratings 110 and 115, respectively, have the same optical characteristics. Each first end thereof is connected to the second and third ports 104 and 106, respectively, of the first coupler 100, and the other ends thereof are connected to the second optical coupler 120. The first and second chirped gratings 110 and 115, respectively, reflect the incident light at different positions according to the wavelengths.

The optical amplifying portion 130 is connected to the fourth port 108 of the first optical coupler 100, and amplifies the optical pulse input from the fourth port 108. The optical amplifying portion 130 includes a first isolator 131, a pump light source 132, a wavelength division multiplexer (WDM) coupler 133 for multiplexing the optical pulse having different wavelengths and the pump light generated by the pump light source 132, an erbium doped fiber (EDF) 134, and a second isolator 135.

The second optical coupler 120 includes first, second, third and fourth ports 122, 124, 126 and 128, respectively,. The second and third ports 124 and 126, respectively, are connected to the first and second chirped gratings 110 and 115, respectively, the first port 122 being connected to the optical amplifying portion 130, and the fourth port 128 being an output port. The second optical coupler 120 divides the optical pulse, which is input after being amplified by the optical amplifying portion 130, with a ratio of 50:50, and outputs the divided optical pulses. The phase of the output optical pulse is shifted by $\pi/2$ whenever coupling occurs.

The operation of the optical pulse amplifier having the above structure will be described. First, when an optical pulse is input via the first port 102 of the first optical coupler 100, an optical pulse having ½ power without phase shift is output to the second port 104, and the optical pulse having ½ power, whose phase is shifted by $\pi/2$ due to coupling, respectively, is output to the third port 106. The second and third ports 104 and 106, respectively, are connected to the first and second chirped gratings 110 and 115, respectively, having the same optical characteristics, and the optical pulses input thereto are reflected at different positions of the first and second chirped gratings 110 and 115, respectively, for each wavelength. The reflection by the first and second chirped gratings 110 and 115, respectively, occurs as follows.

Figure 2:
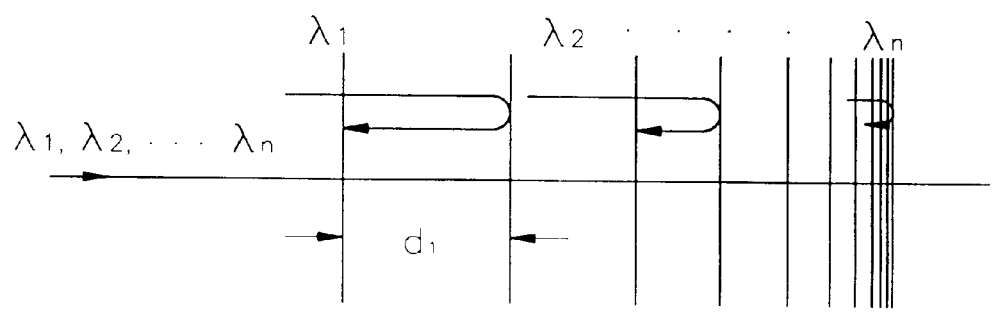
FIG. 2 is a detailed diagram of a chirped grating shown in FIG. 1.

As shown in FIG. 2, the grating period of the chirped grating varies according to the length thereof. Assuming that there are different wavelengths $\lambda_1, \lambda_2, \ldots, \lambda_n$, and that the wavelengths satisfy the condition of $\lambda_1 > \lambda_2 > \ldots > \lambda_n$, the chirped grating reflects the optical pulse for each wavelength at a position which satisfies the Bragg condition. The Bragg condition, causing reflection within the core of the optical fiber grating, is determined by the following equation (1).

$$\lambda_i = 2 \cdot n_{eff} \cdot d_i \quad (1)$$

In the equation (1), $\lambda_1$ is the wavelength of incident light, $n_{eff}$ is the effective refractive index, and $d_i$ is the grating period.

That is, as the grating period becomes longer, the wavelength satisfying the above equation becomes large. Accordingly, an optical pulse having a long wavelength is reflected at a portion having a long grating period, and an optical pulse having a short wavelength is reflected at a portion having a shorter grating period than the optical pulse having the long wavelength. Thus, the optical pulse is increasingly dispersed via the chirped gratings as time passes, thereby broadening the pulse width.

The optical pulse which is re-incident to the second and third ports 104 and 106 of the first optical coupler 110 after being reflected by the first and second chirped gratings 110 and 115, respectively, is output to the first and fourth ports 102 and 108, respectively, with a ratio of 50:50. The optical pulse without the phase shift, re-incident from the second port 104, and the optical pulse having a phase shift of $\pi$, re-incident from the third port 106, are output to the first port 102, so that these optical pulses are canceled out. Accordingly, the first port 102 does not output any optical pulse. The optical pulse which is re-incident from the second port 104 and has a phase shift of $\pi/2$ due to one time coupling, and the optical pulse which is re-incident from the third port 106 and maintains a phase shift of $\pi/2$ due to no coupling, are output to the fourth port 108. That is, the optical pulse output to the fourth port 108 is an intensified optical pulse.

Figure 3:
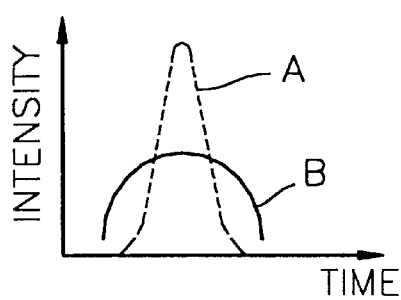
FIG. 3 is an input/output waveform of a first optical coupler shown in FIG. 1.

FIG. 3 shows the pulse which is output to the fourth port 108 after being broadened via the first and second chirped gratings 110 and 115, respectively. In FIG. 3, "A" represents an input pulse, and "B" represents an output pulse.

The optical pulse output from the fourth port 108 is amplified by the optical amplifying portion 130 as follows. First, pump light generated by the pump light source 132, such as a laser diode, is multiplexed by the WDM coupler 133 together with the optical pulse incident via the fourth port 108. The input pump light excites erbium ions $Er^{3+}$ in a base state, contained in the EDF 134 as an amplifying medium, causing population inversion. The EDF 134 amplifies the optical pulse through stimulated emission of the population-inverted Er.

The first isolator 131 prevents amplified spontaneous emission generated by the EDF 134 from being re-incident after being reflected from the fourth port 108 of the first optical coupler 100. The second isolator 135 prevents amplified spontaneous emission generated by the EDF 134 from being re-incident after being reflected from the first port 122 of the second optical coupler 120 connected to the optical amplifying portion 130.

Such amplified optical pulse is input to the first port 122 of the second optical coupler, and output to the second and third ports 124 and 126 with a ratio of 50:50 as in the first optical coupler 100. Each output optical pulse is re-incident onto the first and second chirped gratings 10 and 115 in the direction opposite to the incident direction from the first optical coupler 100. Thus, the optical pulse having a short wavelength is reflected earlier, and the optical pulse having a long wavelength is reflected later, causing pulse compression. The compressed pulse is output to the fourth port 128 of the second optical coupler 120 by the same operation as in the first optical coupler 100.

Figure 4:
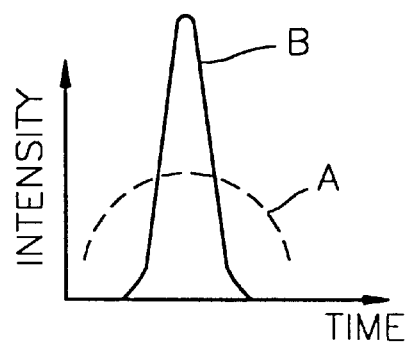
FIG. 4 is an input/output waveform of a second optical coupler shown in FIG. 1.

FIG. 4 shows an input/output wavelength of the second optical coupler 120. In FIG. 4, "A" represents the amplified input pulse and "B" represents the pulse output to the fourth port 128.

Figure 5A:
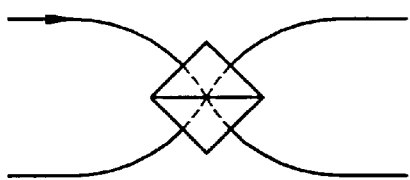
FIG. 5A shows the structure of a polarization beam splitter.
Figure 5B:
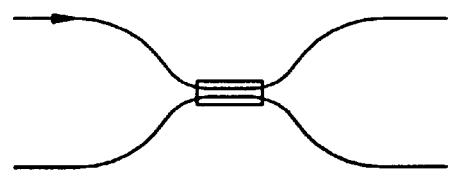
FIG. 5B shows the structure of a fiber polarization splitter.

Here, the first and second optical couplers 100 and 120, respectively, may be a polarization beam splitter or a fiber polarization splitter, other than a 3 dB coupler for dividing the incident optical pulse in a ratio of 50:50, which can determine an output port according to the polarization state and output the optical pulse reflected from the chirped grating to an intended port using a polarization controller. FIG. 5A shows the structure of the polarization beam splitter, and FIG. 5B shows the structure of the fiber polarization splitter.

As described above, in the optical pulse amplifier according to the present invention, a non-linear effect and spectral hole burning effect can be avoided through amplifying and broadening of the optical pulse, and there is less diffraction loss and the manufacture thereof is easy. Also, the output pulse which is the same as the input pulse and has an amplified intensity can be obtained through broadening and compression. Also, using the optical coupler is more economical than using an expensive device such as a circulator.

What is claimed is:

1. An optical pulse amplifier comprising:
   a first optical coupler having first, second, third and fourth ports, for outputting an optical pulse incident onto the first port to the second and third ports, and for providing the optical pulse re-incident from the second and third ports to the fourth port;
   a first grating, connected to the second port of the first optical coupler, for reflecting the incident optical pulse for each wavelength at a position satisfying a Bragg condition;
   a second grating, connected to the third port of the first optical coupler and having the same optical characteristics as the first grating, for reflecting the incident optical pulse for each wavelength at a position satisfying the Bragg condition;
   an optical amplifying portion, connected to the fourth port of the first optical coupler, for amplifying the optical pulse reflected by the first and second gratings and output by the fourth port of the first optical coupler; and
   a second amplified optical coupler, having first, second, third and fourth ports, for outputting the optical pulse incident from the optical amplifying portion connected to the first port to the second and third ports respectively connected to the first and second gratings, and for providing the optical pulse re-incident after being reflected by the first and second gratings to the fourth port.

2. The optical pulse amplifier of claim 1, wherein the first and second optical couplers are a 3 dB coupler.

3. The optical pulse amplifier of claim 1, wherein the first and second optical couplers are a polarization beam splitter.

4. The optical pulse amplifier of claim 1, wherein the first and second optical couplers are a fiber polarization splitter.

5. The optical pulse amplifier of claim 1, wherein the first and second gratings are chirped gratings each having different grating periods according to its position.

6. The optical pulse amplifier of claim 1, wherein the optical amplifying portion comprises:

a pump light source for generating a pump light;

a wavelength division multiplexer for multiplexing the pump light output from the pump light source and the optical pulse incident from the first optical coupler; and an erbium doped fiber for amplifying the optical pulse multiplexed by the wavelength division multiplexer.

7. The optical pulse amplifier of claim 6, wherein the pump light source is a laser diode.

8. The optical pulse amplifier of claim 6, wherein the optical amplifying portion further comprises:

a first isolator, located in front of the wavelength division multiplexer, for preventing amplified spontaneous emission generated by the erbium doped fiber from being re-incident after being reflected by the fourth port of the first optical coupler connected to the optical amplifying portion; and a second isolator, located at the rear of the erbium doped fiber, for preventing amplified spontaneous emission generated by the erbium doped fiber from being re-incident after being reflected by the first port of the second optical coupler connected to the optical amplifying portion.

9. An optical pulse amplifier, comprising:

first optical coupler means having first, second, third and fourth ports for receiving an optical pulse incident on the first port and outputting the optical pulse to the second and third ports, said first optical coupler means providing a reflected optical pulse from the second and third ports to the fourth port;

first grating means connected to the second port of the first optical coupler means for reflecting the optical pulse received therefrom for each wavelength at a position satisfying a Bragg condition;

second grating means connected to the third port of the first optical coupler means and having an optical characteristic identical to an optical characteristic of the first grating means for reflecting the optical pulse received from the third port of the first optical coupler means for each wavelength at a position satisfying the Bragg condition;

optical amplifying means connected to the fourth port of the first optical coupler means for amplifying the reflected optical pulse from the fourth port of the first optical coupler means so as to provide an optical amplifier output; and second optical coupler means having a first port connected to said first grating means, a second port connected to said second grating means, a third port serving as an output of said second optical coupler means, and a fourth port connected to said optical amplifying means for receiving the optical amplifier output, and for providing the optical amplifier output to said first and second ports, respectively, said second optical coupler means providing the optical pulse re-incident after being reflected by the first and second gratings to the third port as an output.

10. The optical pulse amplifier of claim 9, wherein each of the first and second optical coupler means comprises a 3 dB coupler.

11. The optical pulse amplifier of claim 9, wherein each of the first and second optical coupler means comprises a polarization beam splitter.

12. The optical pulse amplifier of claim 9, wherein each of the first and second optical coupler means comprises a fiber polarization splitter.

13. The optical pulse amplifier of claim 9, wherein each of the first and second grating means comprises a chirped grating having a different grating period according to its position.

14. The optical pulse amplifier of claim 9, wherein said optical amplifier means comprises:

a pump light source for generating a pump light;

a wavelength division multiplexer for multiplexing the pump light from said pump light source and the optical pulse from the first optical coupler means to produce a multiplexer output; and an erbium doped fiber for amplifying the multiplexer output.

15. The optical pulse amplifier of claim 14, wherein said pump light source comprises a laser diode.

16. The optical pulse amplifier of claim 14, wherein said optical amplifier means further comprises:

a first isolator connected to an input of said wavelength division multiplexer for preventing amplified spontaneous emission generated by the erbium doped fiber from being re-incident after being reflected by the fourth port of the first optical coupler means; and a second isolator connected between said erbium doped fiber and the fourth port of said second optical coupler means for preventing amplified spontaneous emission generated by the erbium doped fiber from being re-incident after being reflected by the fourth port of the second optical coupler means.

17. The optical pulse amplifier of claim 9, wherein said first optical coupler means divides an input optical pulse received at the first port thereof by a ratio of 50:50.

18. The optical pulse amplifier of claim 9, wherein said first optical coupler means shifts a phase of the optical pulse received at the first port thereof by $\pi/2$ whenever coupling occurs.

19. The optical pulse amplifier of claim 9, wherein said second optical coupler means divides the optical pulse received at the fourth port thereof by a ratio of 50:50.

20. The optical pulse amplifier of claim 9, wherein said second optical coupler means shifts a phase of the optical pulse received at the fourth port thereof by $\pi/2$ whenever coupling occurs.

* * * * *